US006928544B2

(12) United States Patent
Chu (10) Patent No.: US 6,928,544 B2
(45) Date of Patent: Aug. 9, 2005

(54) METHOD AND APPARATUS FOR SECURING MAILING INFORMATION FOR PRIVACY PROTECTION IN ON-LINE BUSINESS-TO-CUSTOMER TRANSACTIONS

(75) Inventor: Heng Chu, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 09/790,233

(22) Filed: Feb. 21, 2001

(65) Prior Publication Data

US 2002/0116640 A1 Aug. 22, 2002

(51) Int. Cl.[7] .............................................. G06F 11/30
(52) U.S. Cl. ....................... 713/153; 713/161; 713/162
(58) Field of Search ................................. 713/153, 161, 713/162

(56) References Cited

U.S. PATENT DOCUMENTS 6,029,150 A * 2/2000 Kravitz ......................... 705/39
6,125,352 A * 9/2000 Franklin et al. .............. 705/26

* cited by examiner

Primary Examiner—Thomas R. Peeso
(74) Attorney, Agent, or Firm—Yee & Associates, P.C.

(57) ABSTRACT

A method, apparatus, and computer implemented instructions in a data processing system for shipping an item. The system includes receiving an encrypted address identifying a destination for the item, associating the encrypted address with the item, and using a carrier to deliver the item to the encrypted address, wherein the carrier decrypts the encrypted address to deliver the item to the destination. The encrypted address may be encrypted in a manner to limit reusability, such as a single use or a particular carrier.

26 Claims, 7 Drawing Sheets

METHOD AND APPARATUS FOR SECURING MAILING INFORMATION FOR PRIVACY PROTECTION IN ON-LINE BUSINESS-TO-CUSTOMER TRANSACTIONS

FIELD OF THE INVENTION

The present invention provides an improved data processing system and in particular a method and apparatus for facilitating data transfer. Still more particularly, the present invention provides a method and apparatus for securing mailing information in on-line transactions over a network data processing system.

BACKGROUND OF THE INVENTION

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

In on-line transactions over the Internet, the ideal on-line shopping situation provides a customer or user an ability to be anonymous. This situation is similar to the traditional brick-and-mortar store in which a person may enter the store, browse products, purchase a product with cash, and leave. In such a case, this type of store knows little or nothing about the customer's buying patterns. In this manner, the customer's privacy is protected. With on-line stores, it is very easy for these businesses to collect buying patterns of customers. The collection of this information may be facilitated through the use of cookies, universal resource locator rewriting, and hidden fields in dynamically generated HTML files. Many customers do not want to be identified and have their buying patterns associated with them for distribution to others.

In the current e-commerce world, such an anonymous shopping situation is impossible because it is very easy for on-line stores to identify individuals buying goods. The identification of an individual may be achieved by tracking down credit card information as well as mailing address information and a phone number for the user. In addition, giving out the mailing address or phone number typically invites unsolicited and annoying mailings, physical or e-mail, as well as telemarketing calls. Currently, it is difficult to prevent this type of identification and unsolicited activities from occurring because real personal information, such as credit card number, mailing address, and phone numbers, are required to be given and stored at an on-line store or business.

Therefore, it would be advantageous to have an improved method and apparatus for increasing the anonymity of on-line shopping.

SUMMARY OF THE INVENTION

The present invention provides a method, apparatus, and computer implemented instructions in a data processing system for shipping an item. The system includes receiving an encrypted address identifying a destination for the item, associating the encrypted address with the item, and using a carrier to deliver the item to the encrypted address, wherein the carrier decrypts the encrypted address to deliver the item to the destination. The encrypted address may be encrypted in a manner to limit reusability, such as a single use or a particular carrier.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
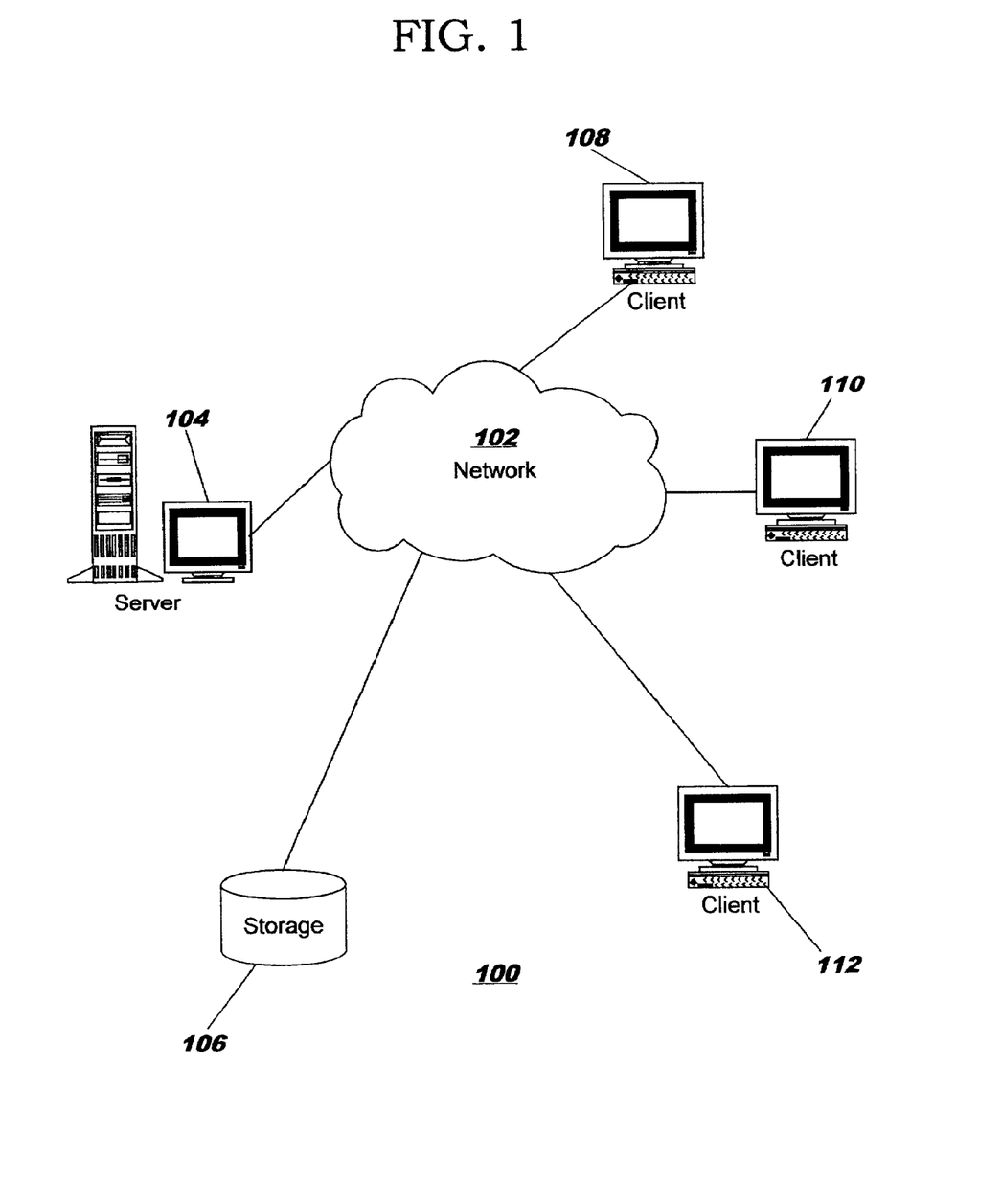
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
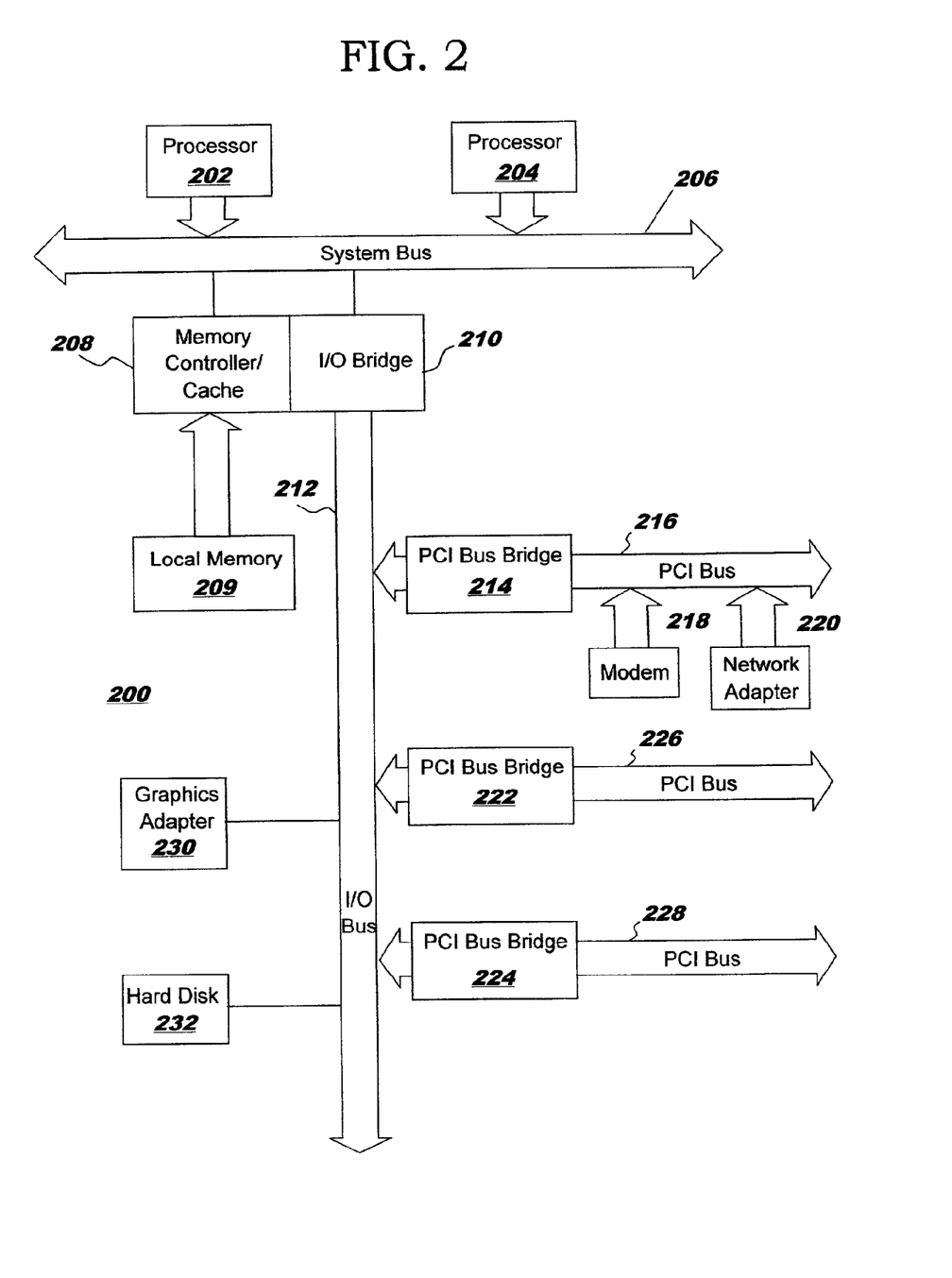
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
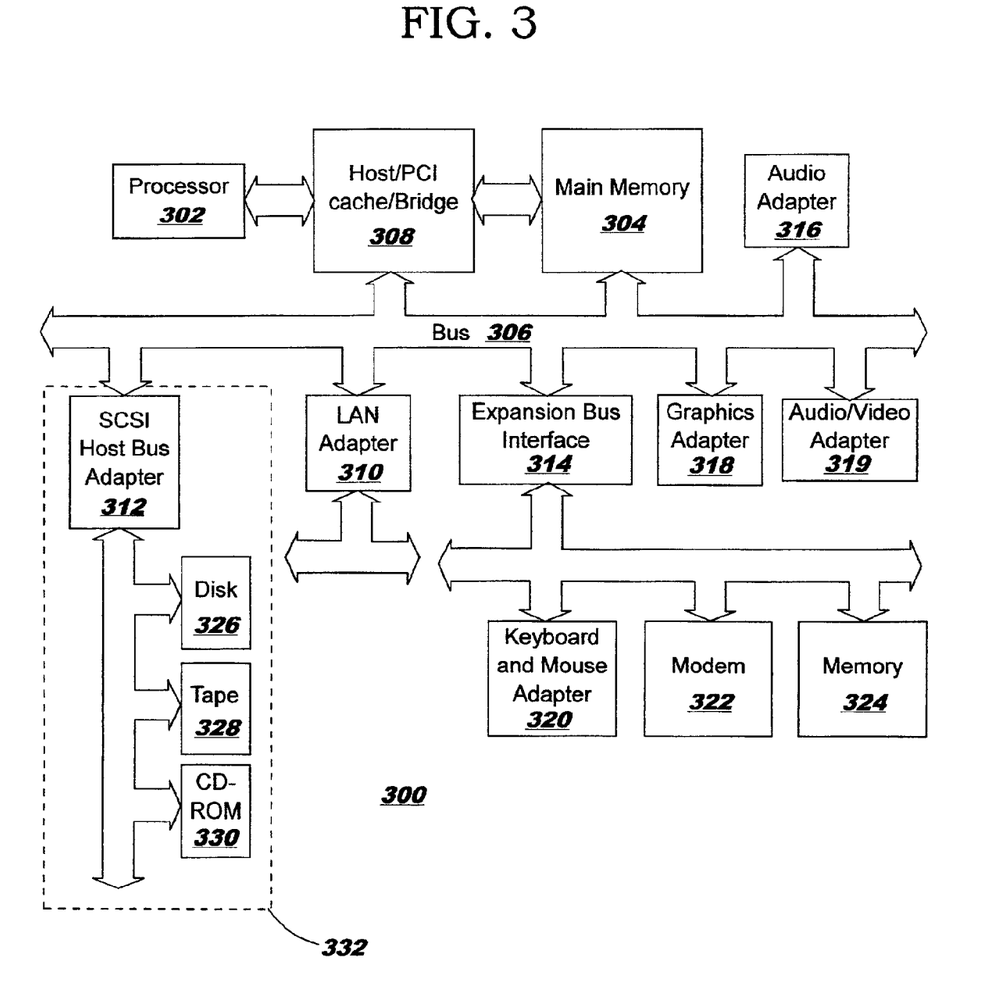
FIG. 3 is a block diagram of a data processing system that may be implemented as a server in accordance with a preferred embodiment of the present invention.

With reference now to FIG. 3, a block diagram of a data processing system that may be implemented as a server, such as server 104 in FIG. 1, is depicted in accordance with a preferred embodiment of the present invention. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer implemented instructions for increasing the anonymity of a user or customer in an on-line purchase transaction over a network data processing system. The mechanism provides for employing encrypted mailing information to protect the privacy of a customer purchasing products. In the depicted examples, a single use mailing information data structure is employed. This mailing information in these examples includes a name, mailing address, and phone number. This mailing information is structured so that the information is only useable once in these examples. This limited reusability prevents reuse of the mailing information by others, such as entities that mass mail advertisements.

Figure 4:
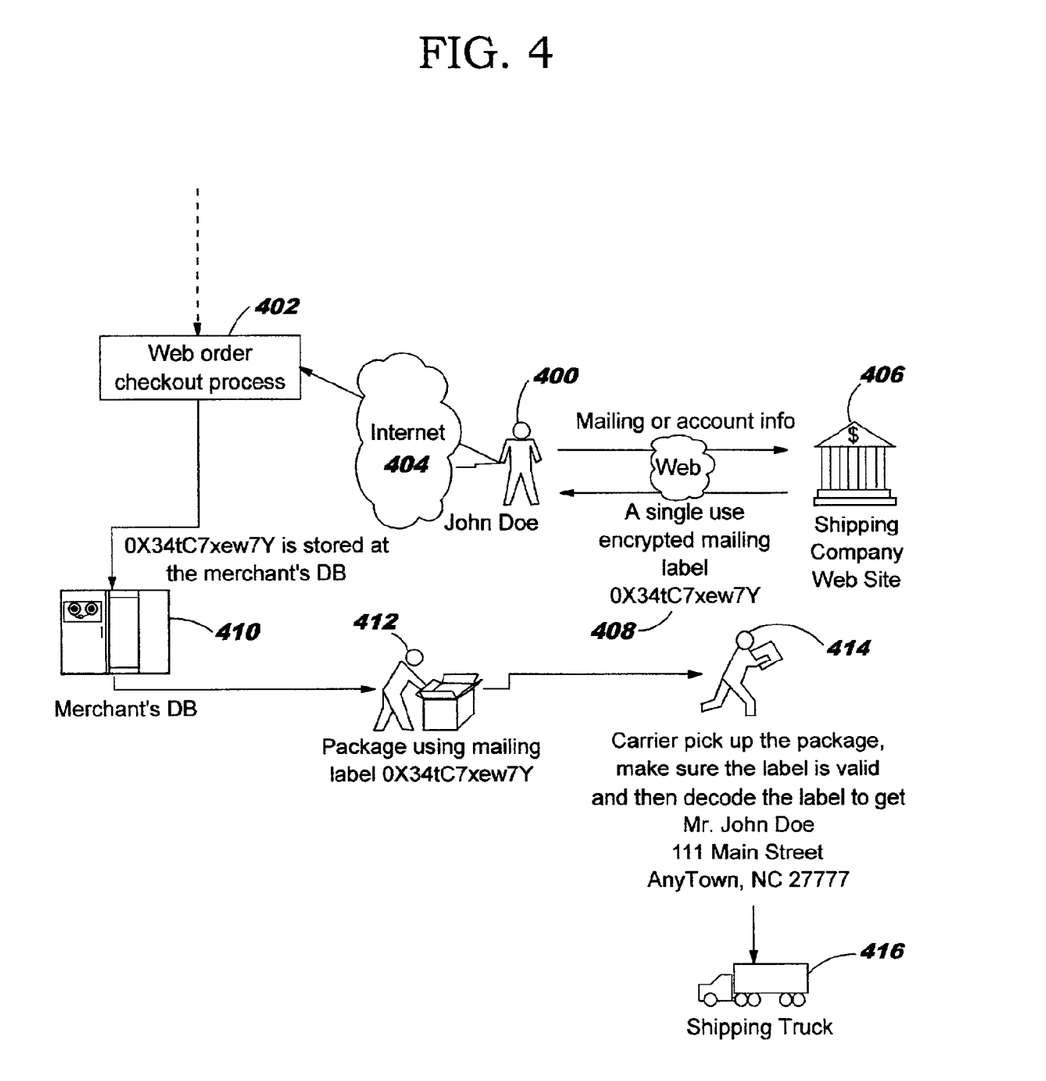
FIG. 4 is a diagram illustrating data flow in using non-traceable personal information in transactions on a network data processing system such as the Internet in accordance with a preferred embodiment of the present invention.

Turning now to FIG. 4, a diagram illustrating data flow in using non-traceable personal information in transactions on a network data processing system, such as the Internet is depicted in accordance with a preferred embodiment of the present invention. In this example, the information is non-traceable and allows transactions to complete as well as delivery of the purchased items or merchandise. As illustrated, user 400 starts check out process 402 over Internet 404 as part of an on-line transaction. Next, user 400 contacts shipping company web site 406 and transmits mailing or account information to shipping company web site 406. In return, single use encrypted mailing label 408 is returned to user 400. This mailing label is in the form of an encrypted data structure. This encryption involves the conversion of data and the mailing information into a secret code for transmission. The original text or "plain text" is converted into a coded equivalent, which is also called "ciphertext" via an encryption algorithm. This ciphertext may be de-crypted using a key. Typically, the encryption algorithm will employ a key having a binary number, such as from 40 to 128 bits in length. The greater number of bits in the key, the more possible combinations and the longer it takes to break the code. The number of bits in the key is also used to identify the cipher strength. The data may be encrypted or locked by combining the bits in the key mathematically with the data bits. When the information is to be used, the key may be used to unlock the code and restore the original data.

Example of system includes a data encryption standard (DES) algorithm, which is a standard secret key cryptography method that is fast and widely used. Another cryptography method, which may be used in the mechanism of the present invention is rivest-shmair-adleman (RSA), which is a highly secure cryptography method that also is commonly used. Of course, the mechanism of the present invention may employ any known cryptography method.

Single use encrypted mailing label 408 is sent to web order checkout process 402 and stored in merchant database 410. The limited reusability of single use encrypted mailing label 408 prevents the use of this information from being shared with other entities. In this manner, the privacy of the user is increased because this mailing label cannot be reused by another party. This encrypted label is used in association with package 412 for shipping the item to user 400. In this example, the encrypted mailing label is printed onto a physical label and affixed to the package. The letters and numbers making up the encrypted mailing label may be printed onto the label in text form or in other forms, such as a bar code. Alternatively, the information from encrypted mailing label 408 may be placed on a storage media affixed to or otherwise associated with package 412. Such storage media may include, for example, a magnetic strip, or a memory card, such as a memory stick or compact flash card. Carrier 414 picks up package 412.

Additionally, carrier 414 will ensure that the label is valid and decode the label to obtain the actual mailing information, which in this example is Mr. John Doe, 111 Main Street, AnyTown, N.C. 2777.

The package is then placed on shipping truck 416 with the decoded mailing label and sent to user 400. Carrier 414 may be the same entity that runs shipping company web site 406. If they are different entities, then a key must be given to carrier 414 to decode the encrypted shipping information.

Figure 5:
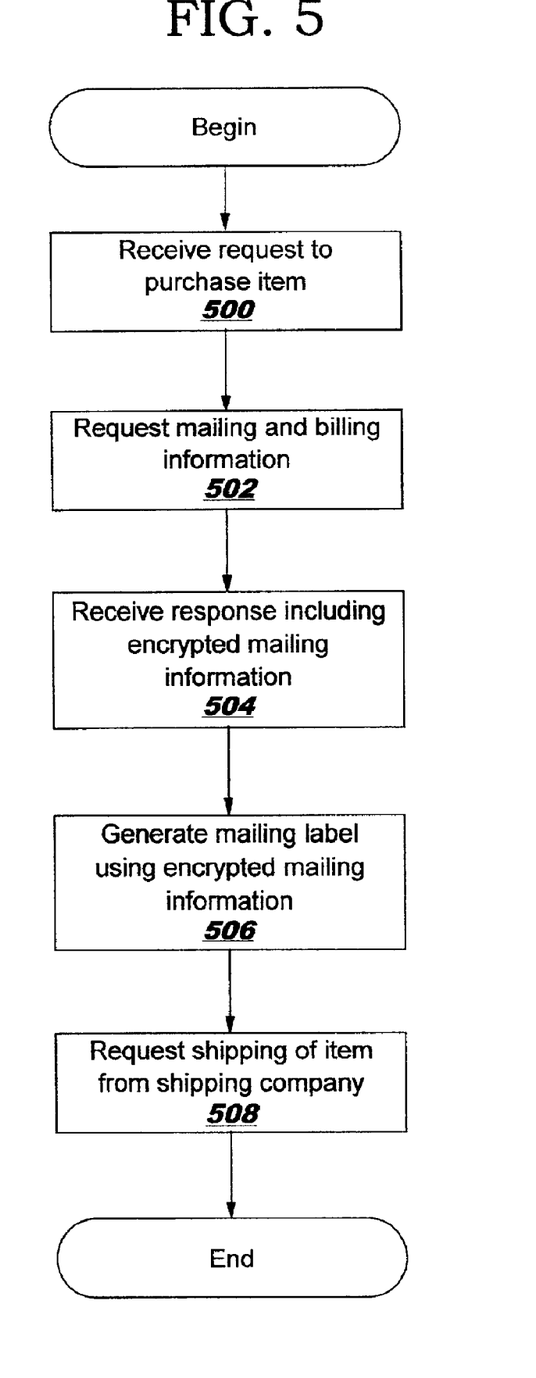
FIG. 5 is a flowchart of a process for processing an order of an item using encrypted mailing information in accordance with a preferred embodiment of the present invention.

Turning now to FIG. 5, a flowchart of a process for processing an order of an item using encrypted mailing information is depicted in accordance with a preferred embodiment of the present invention. The process illustrated in FIG. 5 may be implemented in a server, such as data processing system 200 in FIG. 2 as part of a web order checkout process, such as web order check out process 402 in FIG. 4.

The process begins by receiving a request to purchase an item (step 500). This request is received from a customer desiring to purchase a particular item offered by the on-line business. Mailing and billing information is then requested (step 502). A response including encrypted mailing information is received (step 504). This encrypted mailing information contains the mailing address to which the item is to be sent. The information is encrypted such that the on-line business is unable to identify the address. The address may only be identified by unencrypting the information received. A mailing label is then generated using the encrypted mailing information (step 506). A shipping company is requested to pick up and deliver the item (step 508) with the process terminating thereafter.

Figure 6:
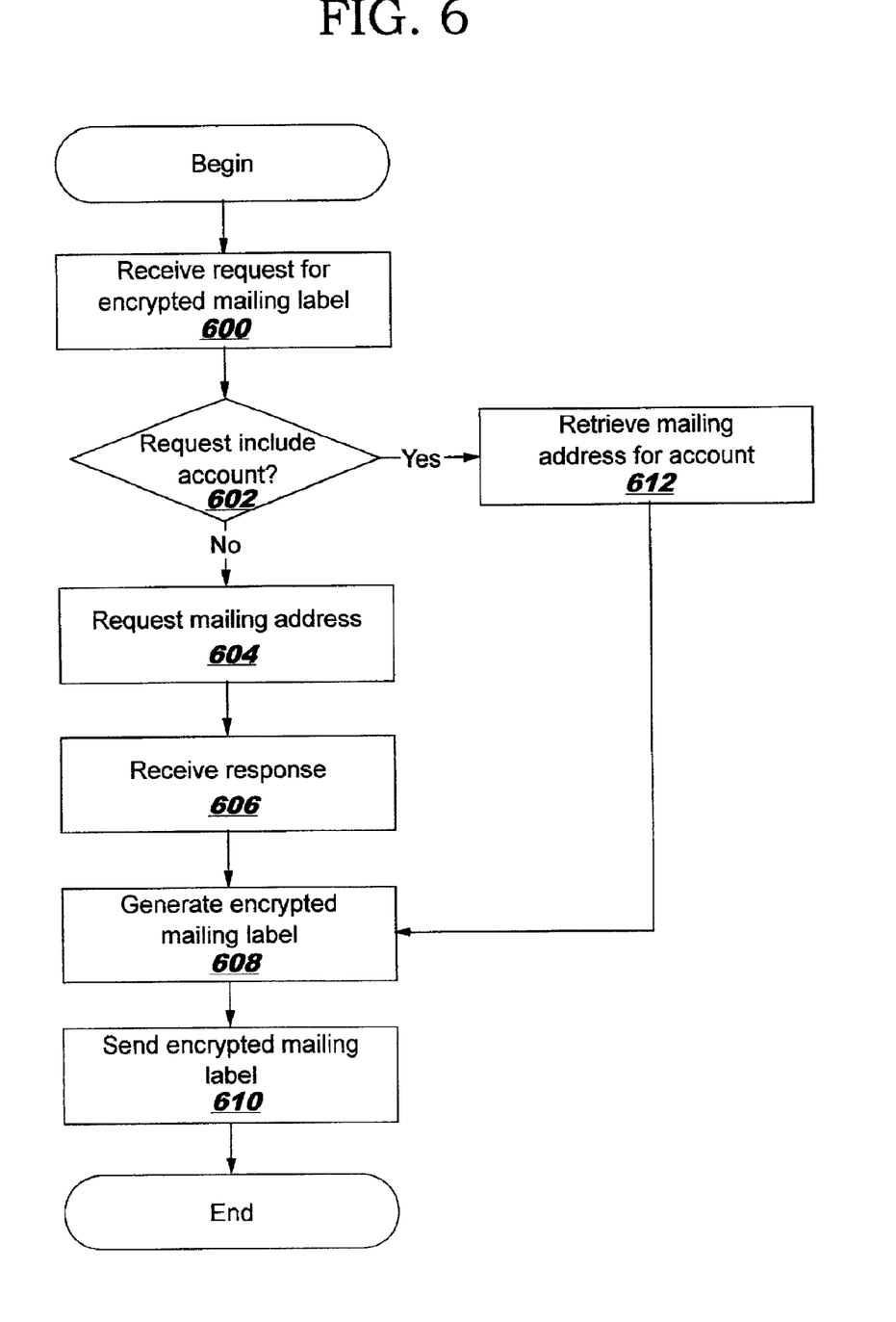
FIG. 6 is a flowchart of a process used for generating encrypted mailing information in accordance with a preferred embodiment of the present invention.

Turning next to FIG. 6, a flowchart of a process used for generating encrypted mailing information is depicted in accordance with a preferred embodiment of the present invention. This process may be implemented in a data processing system, such as data processing system 200 in FIG. 2 for presenting a web site, such as shipping company web site 406 in FIG. 4.

The process begins by receiving a request for an encrypted mailing label (step 600). A determination is made as to whether the request includes an account (step 602). The request may include the actual shipping address or just account information for the requester. If the request does not include an account, then a mailing address is requested (step 604). A response is received (step 606). An encrypted mailing label is generated (step 608). The encrypted mailing label is then sent back to the requester (step 610) with the process terminating thereafter.

With reference again to step 602, if the request includes an account, then the mailing address for the account is retrieved (step 612) with the process then proceeding to step 608 to generate an encrypted mailing label as described above.

The encrypted mailing label takes the form of an encrypted version of the mailing address information received in the response in step 606. This encryption may be performed using any known encryption process.

Encryption algorithms used to generate an encrypted mailing label also may include replacing the mailing information with an i.d. or database key for a record in the database of a shipping company. The record corresponding to this record or database key contains the real mailing information. In such a case, decoding or decrypting the encrypted mailing label involves connecting to the database of the shipping company to retrieve the mail information based on the i.d. or database key.

Figure 7:
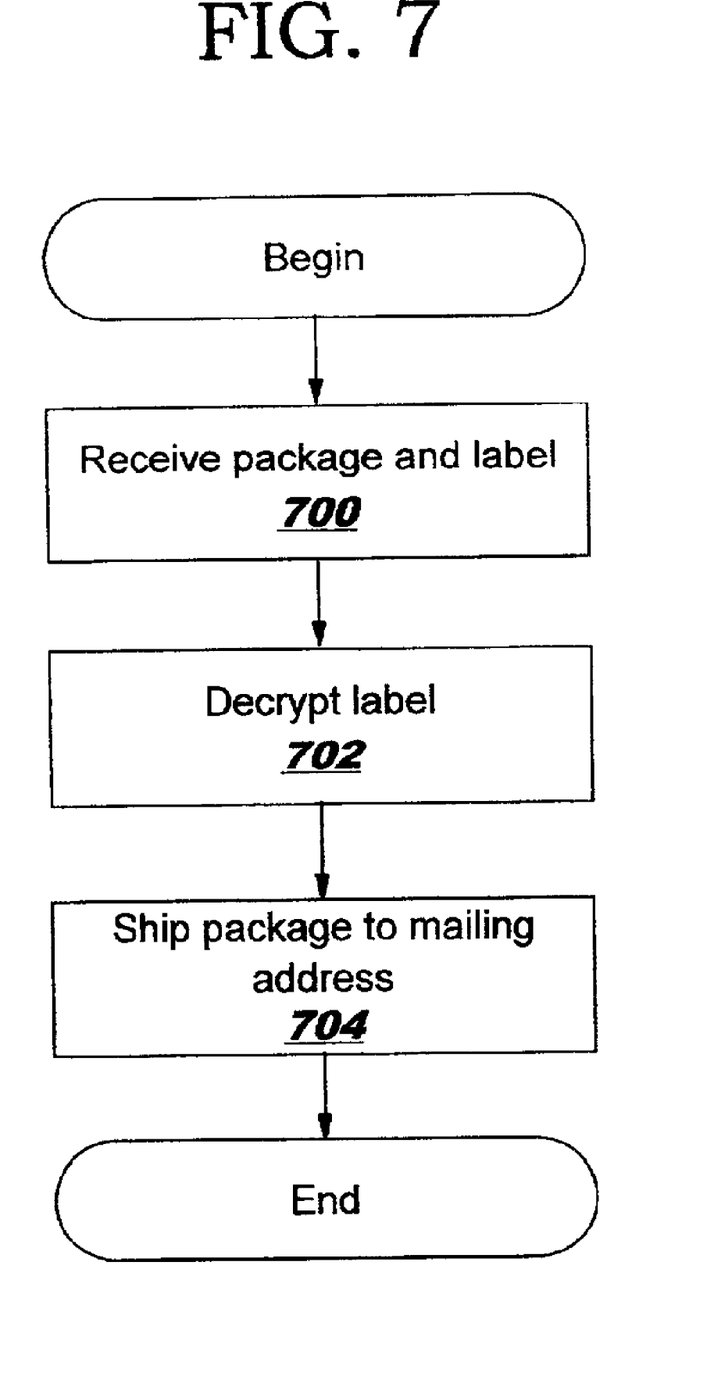
FIG. 7 is a flowchart of a process for handling shipping of a package containing an encrypted mailing label in accordance with a preferred embodiment of the present invention.

Turning next to FIG. 7, a flowchart of a process for handling shipping of a package containing an encrypted mailing label is depicted in accordance with a preferred embodiment of the present invention. The process illustrated here may be performed by carrier 414 in FIG. 4.

The process begins by receiving a package and an encrypted mailing label (step 700). The label is then decrypted using a key (step 702). If the carrier is the same entity that generates the encrypted mailing label, the carrier will have the key to decrypt the label. Otherwise, the key is transferred from the shipping company web site to the carrier. After the label is decrypted, the package is then shipped to the mailing address (step 704) with the process terminating thereafter.

Thus, the present invention provides an improved method, apparatus, and computer implemented instructions for increasing the anonymity of a user purchasing items from an on-line business. The mechanism of the present invention prevents the on-line business from being able to identify shipping or mailing information for the user. Information, such as a mailing address, the name of the customer, and the phone number for the customer is encrypted. This information is given to the on-line business in the encrypted form. The business associates this encrypted information with the item and transfers it to a carrier or shipping business to actually deliver the item. The carrier or shipping business has the key or the mechanism needed to unencrypt the information and identify the destination of the item.

Further, although the depicted examples showed the use of the encrypted mailing information as being useable only once, the encrypted information may be encrypted such that it is valid for a particular carrier. In this manner, a user does not have to request a new encrypted mailing label each time a purchase is made.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a merchant data processing system for shipping an item, the method comprising:

receiving, at the merchant data processing system, an encrypted address identifying a destination for the item;

associating the encrypted address with the item; and providing from the merchant data processing system to a carrier the encrypted address to deliver the item to the encrypted address, wherein the carrier decrypts the encrypted address to deliver the item to the destination.

2. The method of claim 1, wherein the steps of receiving, associating, and providing are performed by a server for a merchant web site.

3. The method of claim 1, wherein the associating step comprises printing the encrypted address on a label to be associated with the item.

4. The method of claim 1, wherein the associating step comprises placing the encrypted address on a storage media associated with the item.

5. The method of claim 4, wherein the storage media comprises a magnetic strip, a memory card, and an optical disk.

6. A method in a data processing system for shipping an item, the method comprising:

generating an encrypted mailing label using an address to a destination in response to receiving a request for the encrypted mailing label to the destination from a requestor; and sending the encrypted mailing label to the requestor.

7. The method of claim 6, wherein the generating step comprises:

determining whether an address is present in the request; and responsive to the address being present in the request, creating the encrypted mailing address information using the address in the request.

8. The method of claim 7, wherein the generating step further comprising:

responsive to the address being absent in the request, determining whether an account is present for the requestor; and responsive to the account being present, creating the encrypted mailing address information using an address associated with the account.

9. The method of claim 6, further comprising:
receiving an item to be delivered associated with the encrypted mailing label;
reading the encrypted mailing label to form encrypted address information; and
decrypting the encrypted address information to form a destination address.

10. A data processing system for shipping an item, the data processing system comprising:
receiving means for receiving, at a merchant, an encrypted address identifying a destination for the item;
associating means for associating the encrypted address with the item; and
providing means for providing from the merchant to a carrier the encrypted address to deliver the item to the encrypted address, wherein the carrier decrypts the encrypted address to deliver the item to the destination.

11. The data processing system of claim 10, wherein the receiving means, associating means, and providing means are located in a server for a merchant web site.

12. The data processing system of claim 10, wherein the associating means comprises:
printing means for printing the encrypted address on a label to be associated with the item.

13. The data processing system of claim 10, wherein the associating means comprising:
placing means for placing the encrypted address on a storage media associated with the item.

14. The data processing system of claim 10, wherein the storage media comprises a magnetic strip, a memory card, and an optical disk.

15. A data processing system for shipping an item, the data processing system comprising:
generating means for generating an encrypted mailing label using an address to a destination in response to receiving a request for the encrypted mailing label to the destination from a requestor; and
sending means for sending the encrypted mailing label to the requestor.

16. The data processing system of claim 15, wherein the generating step comprises:
determining means for determining whether an address is present in the request; and
creating means, responsive to the address being present in the request, for creating the encrypted mailing address information using the address in the request.

17. The data processing system of claim 16, wherein the generating means further comprising:
determining means, responsive means to the address being absent in the request, for determining whether an account is present for the requestor; and
creating means, responsive to the account being present, for creating the encrypted mailing address information using an address associated with the account.

18. The data processing system of claim 15, further comprising:
means for receiving an item to be delivered associated with the encrypted mailing label;
means for reading the encrypted mailing label to form encrypted address information; and
means for decrypting the encrypted address information to form a destination address.

19. A data processing system comprising:
a bus system;
a communications unit connected to the bus system;
a memory connected to the bus system, wherein the memory includes as set of instructions; and
a processing unit connected to the bus system, wherein the processing unit executes the set of instructions to receive an encrypted address identifying a destination for the item; associate the encrypted address with the item; and use a carrier to deliver the item to the encrypted address, wherein the carrier decrypts the encrypted address to deliver the item to the destination.

20. The data processing system of claim 19, wherein the bus system is a single bus.

21. The data processing system of claim 19, wherein the bus system includes a primary bus and a secondary bus.

22. The data processing system of claim 19, wherein the processing unit includes a plurality of processors.

23. The data processing system of claim 19, wherein the communications unit is one of a modem and Ethernet adapter.

24. A data processing system comprising:
a bus system;
a communications unit connected to the bus system;
a memory connected to the bus system, wherein the memory includes as set of instructions; and
a processing unit connected to the bus system, wherein the processing unit executes the set of instructions to generate encrypted mailing label using an address to a destination in response to receiving a request for the encrypted mailing label to the destination from a requestor, and send the encrypted mailing label to the requestor.

25. A computer program product in a computer readable medium for shipping an item, the computer program product comprising:
first instructions for receiving, at a merchant, an encrypted address identifying a destination for the item;
second instructions for associating the encrypted address with the item; and
third instructions for providing from the merchant to a carrier the encrypted address to deliver the item to the encrypted address, wherein the carrier decrypts the encrypted address to deliver the item to the destination.

26. A computer program product in a computer readable medium for shipping an item, the computer program product comprising:
first instructions for generating an encrypted mailing label using an address to a destination in response to receiving a request for the encrypted mailing label to the destination from a requestor; and
second instructions for sending the enervated mailing label to the requestor.

* * * * *

UNITED STATES PATENT AND TRADEMARK OFFICE
CERTIFICATE OF CORRECTION

PATENT NO. : 6,928,544 B2
DATED : August 9, 2005
INVENTOR(S) : Chu

It is certified that error appears in the above-identified patent and that said Letters Patent is hereby corrected as shown below:

Column 10,
Line 56, after "sending the" delete "enervated" and insert -- encrypted --.

Signed and Sealed this

Twenty-seventh Day of December, 2005

JON W. DUDAS
*Director of the United States Patent and Trademark Office*